Jan. 3, 1961 K. O. HEINTZ 2,966,953
APPARATUS FOR PRESENTING SEISMIC DATA
Filed Nov. 14, 1955 2 Sheets-Sheet 1
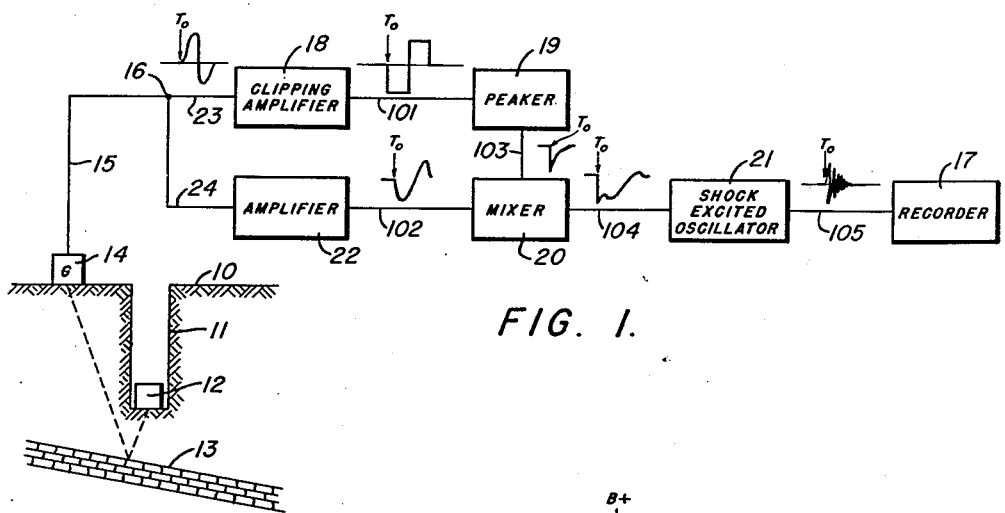
FIG. 1.
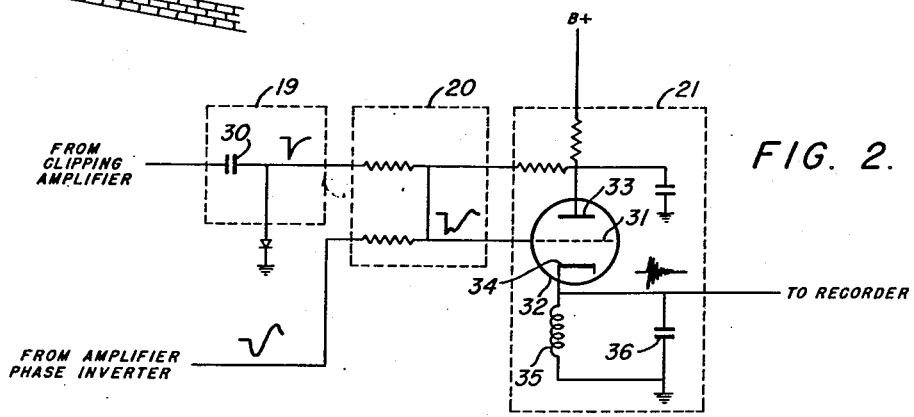
FIG. 2.
FIG. 3.
INVENTOR.
Karl O. Heintz,
BY Frank S. Troidl
ATTORNEY.

Jan. 3, 1961   K. O. HEINTZ   2,966,953
APPARATUS FOR PRESENTING SEISMIC DATA
Filed Nov. 14, 1955   2 Sheets-Sheet 2

INVENTOR.
Karl O. Heintz,
BY
Frank S. Troidl
ATTORNEY.

United States Patent Office 2,966,953
Patented Jan. 3, 1961

2,966,953

APPARATUS FOR PRESENTING SEISMIC DATA

Karl O. Heintz, Houston, Tex., assignor, by mesne assignments, to Jersey Production Research Company, Tulsa, Okla., a corporation of Delaware Filed Nov. 14, 1955, Ser. No. 546,697

3 Claims. (Cl. 181—.5)

This invention relates to a system for presenting seismic data. More particularly this invention relates to a new and useful system for presenting seismic data which data is recorded in a form which enables a computer to recognize subsurface reflections.

In prospecting for valuable mineral deposits, such as oil, one method utilized is the seismic reflection technique. In seismic prospecting a seismic wave is initiated by means of an explosive or other means adapted to cause the propagation of seismic waves through the subsurface; if it should impinge upon a subsurface boundary separating subsurface formations having different elastic properties the seismic wave will be reflected from said boundary and returned to the surface of the earth. A geophone or geophone spread is utilized to detect the reflected seismic waves and generate an electrical signal which in amplitude and frequency is similar to the amplitude and frequency of the detected seismic waves.

It is conventional in seismic prospecting to record the generated electrical signals in a form such that a trace appears on the record for each detecting geophone which trace consists of a plurality of substantially sine waves having many frequencies. The records so obtained are analyzed by human computers for the purpose of determining reflecting subsurface boundaries preparatory to locating structure which is likely to contain oil deposits. The conventional records are very difficult to analyze and require exceptionally skilled computers.

Recently, seismic prospectors became interested in improving the manner of presenting the seismic data obtained from seismic prospecting. Consequently, methods have been developed which present the data in a different form from that conventionally presented so as to enable the computers to more easily and accurately ascertain the location of subsurface boundaries. An example of one type of presentation is disclosed in Patent No. 2,767,-388, W. M. Rust, Jr. In Patent No. 2,767,388 the record is presented in the form of pulses which are representative of particular points on the original electric signals generated from the geophones.

The present invention is directed to apparatus for practicing another method of presenting seismic data which method consists of recording electrical signals representative of particular points on the original electric signals generated by the detecting geophones with the record of said recorded electric signals being in length proportional to the amplitude of the original signal from which the recorded signal is extracted. Therefore, a record is obtained which contains recorded electrical signals which not only represent particular times on a record but also gives an indication of the relative amplitudes of the detected seismic signals.

Other objects and a fuller understanding of the invention may be had by referring to the following description and claims, taken in conjunction with the accompanying drawings in which:

Fig. 1 is a block diagram of one type of system which might be utilized in practicing my new method;

Fig. 2 is an electric circuit diagram of a portion of the system shown in Fig. 1;

Fig. 3 is a graphical representation showing a comparison between the signals generated by the geophones and the record obtained utilizing the system of Fig. 1;

Figure 4:
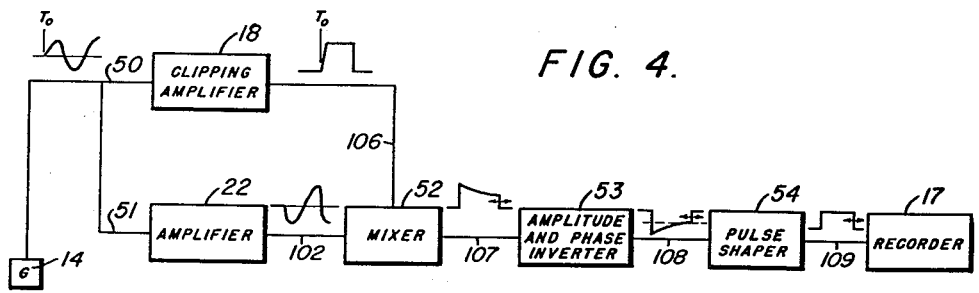
Fig. 4 is a block diagram showing a second system which might be utilized in practicing my new method.

Referring to the drawings and more particularly to Fig. 1, numeral 10 represents the surface of the earth into which has been drilled a borehole 11. Positioned in borehole 11 is a stick of dynamite represented generally by numeral 12. Though dynamite is shown in Fig. 1, it is to be understood that other sources of seismic waves, such as a heavy weight dropped upon the surface of the earth, may be utilized in practicing my new method. The seismic waves generated by the dynamite 12 are propagated through the subsurface and impinge upon a boundary between formations of different elastic properties; the boundary is indicated by numeral 13. The seismic waves are reflected from boundary 13 and are propagated through the subsurface of the earth and detected by a geophone 14. Geophone 14 might be any type of geophone which is utilized to generate an electrical signal having an amplitude and frequency similar to the amplitude and frequencies of the detected seismic waves. The signals, which are substantially sinusoidal in form, are conducted by conductor 15 to a junction point represented by numeral 16.

The conductor 15 and junction 16 constitute a portion of an electrical circuit system which interconnects the geophone 14 with a recorder 17. Also included in the electrical circuit is a clipping amplifier 18, a peaker 19 connected to the output of amplifier 18 by electrical conductors 101, a mixer 20 connected to the ouput of peaker 19 by electrical conductors 103, and a shock excited oscillator 21 connected to the output of mixer 20 by electrical conductors 104. The junction 16 is located at the beginning of two branches of the electrical circuit. One branch includes the clipping amplifier 18 and peaker 19; the other branch includes an amplifier 22. The output of amplifier 22 is connected to mixer 20 by electrical conductors 102. The two branches interconnect again at the mixer 20 whereat the electrical signals on conductors 102 and conductors 103 are mixed and appear on conductors 104.

The signals conducted through conductors 15 (which signals are substantially sinusoidal) are conducted through both conductors 23 and 24. The substantially sinusoidal signals are fed to the clipping amplifier 18 through conductor 23 are amplified inverted, and clipped in a conventional manner to produce an amplified square wave output from the clipping amplifier 18. The term "square wave" as used herein refers to a waveform that varies from one to the other of two definite values, giving a square or rectangular pattern. The leading edge $T_0$ of each square wave corresponds in time to the positive upswing $T_0$ of the substantially sinusoidal signals fed to the clipping amplifier 18.

The square waves are fed to a peaker circuit 19. The time constant of the peaker circuit 19 is adjusted to produce pulses which are fairly sharp pulses and occur at the same time $T_0$ as the leading edge of each square wave fed to the peaker 19. The pulses produced by peaker 19 are fed to the mixer circuit 20.

The signals generated by geophone 14 are also fed to the second branch of the electrical circuit by means of conductor 24 to an amplifier and phase inverter 22. The signals from amplifier 22 are conducted to the mixer 20 where the amplified and inverted signal is combined with the pulses from peaker 19 to produce signals which are a combination of the pulses from peaker 19 and the amplified and inverted signals from amplifier 22.

The output of mixer 20 is fed to the shock excited oscillator 21. The shock excited oscillator 21 which is normally not oscillating begins to oscillate upon receiving the signal from mixer 20, with said oscillation continuing for a length of time proportional to the amplitude of the received signals. The oscillations are fed to recorder 17 and recorded. Hence, it can be seen that the recorded oscillations occur in time at the beginning of the positive upswing of the original substantially sinusoidal wave forms and the length of a recording of oscillations from each excitation of the oscillator is proportional in length to the amplitude of the corresponding positive upswing of the sinusoidal wave form.

In Fig. 2 there is shown an electrical circuit diagram of the peaker 19, the mixer 20, and the shock excited oscillator 21. As shown in Fig. 2 the peaker 19 includes therein a capacitor 30 which has a sufficiently small capacitance to make the time constant of the peaker 19 small compared to the period of the received seismic signals. For example, a capacitor having a capacitance of .02 m.f.d. has been found very satisfactory. The pulses produced by peaker 19 are combined by mixer 20 with the amplified and inverted signals from the amplifier and phase inverter 22. The combined signal is a pulse whose length (or duration) is substantially proportional to the amplitude of the original signal for the relatively narrow range of frequencies covered by seismic signals, particularly after filtering thereof in the conventional manner. For small amplitude signals the length is essentially that of the pulse generated by the peaker 19. As the amplitude of the input signal increases, the length of the combined signal increases. The combined signal is fed to the grid 31 of an electronic tube 32. The grid 31 is normally positively biased so that current is flowing from the plate 33 of electronic tube 32 to the cathode 34 of elecronic tube 32 and thence to the circuit consisting of an inductance 35 and a capacitor 36. When the negative signal is received at grid 31 the flow of current from plate 33 to cathode 34 is interrupted and the current within the circuit including inductance 35 and capacitor 36 oscillates between the inductance 35 and capacitor 36 resulting in the production of a relatively high frequency signal which is conducted to the recorder 17 and recorded. The inherent resistance of the oscillating circuit 21 damps the high frequency output signal. The oscillations will cease when the voltage on grid 31 increases to the cut-off voltage of electronic tube 32. The wave form of the output voltage of the peaker circuit 19 should be chosen so that the sum voltage of the amplifier 22 output voltage (at the lowest frequency and amplitude of interest) and the peaker circuit 19 output voltage will not become less than the cut-off voltage of electronic tube 32 before the amplitude of the amplifier 22 output voltage reaches an extreme negative value on a given cycle; otherwise, the oscillations of oscillator 21 will be stopped prematurely. The length of time the high frequency signal continues is proportional to the length of the negative pulse fed to the grid 31.

Fig. 3 shows an example of the type of presentation obtained by utilizing the system of Fig. 1 as compared to the original signal generated from the geophone. As shown in Fig. 3 places of high amplitude such as at 40 and 41 on the original signal show up on the record as high frequency signals which begin at the positive upswing and last for a relatively long time when compared to small amplitude signals such as those shown at 42 and 43. A human computer looking at the records obtained by my new method and system does not have to fathom from the complex conventional signals the desired reflection information; he need merely look at my new type of record presentation and obtain therefrom the times of reflecting events and also an indication of the amplitudes of said reflecting events.

Fig. 4 shows a second system which might be utilized in practicing my new method. As shown in Fig. 4 wherein like parts, when compared with Fig. 1, are referred to by like numerals the electrical circuit interconnecting the geophone 14 and the recorder 17 includes two branches 50 and 51 with branch 50 including therein a clipping amplifier 18 similar to the clipping amplifier shown in Fig. 1. Branch 51 includes therein an amplifier 22 similar to the amplifier and phase inverter shown in Fig. 1. The signals from clipping amplifier 18 are transmitted to mixer 20 on electrical leads 106, and the signals from amplitude and phase inverter 22 are transmitted to mixer 52 by electrical conductors 102. The signals on electrical conductors 102 and electrical conductors 106 are combined by mixer 52. Mixer 52 is structurally different and produces a different form of pulse from that of mixer 20 shown in Fig. 1 and will be described in more detail with respect to Fig. 5. The pulses produced from mixer 52 are in length proportional to the amplitudes of the corresponding substantially sinusoidal signals from geophone 14. The pulses from mixer 52 are fed to an amplitude and phase inverter 53 on electrical conductors 107 and thence to a pulse shaper 54 on electrical conductors 108. The pulse shaper 54 produces a pulse which is constant in amplitude but in length is proportional to the length of the received pulses from amplitude and phase inverter 53, which in turn are proportional to the amplitudes of the original seismic signals. The pulses from pulse shaper 54 are transmitted to recorder 17 by electrical conductors 109 and are recorded by recorder 17. Therefore, it can be seen that by utilizing the system shown in Fig. 4 pulses are recorded which are in length proportional to the amplitude of the original substantially sinusoidal signals they represent and in time correspond to the positive upswing of the sinusoidal signals.

Figure 5:
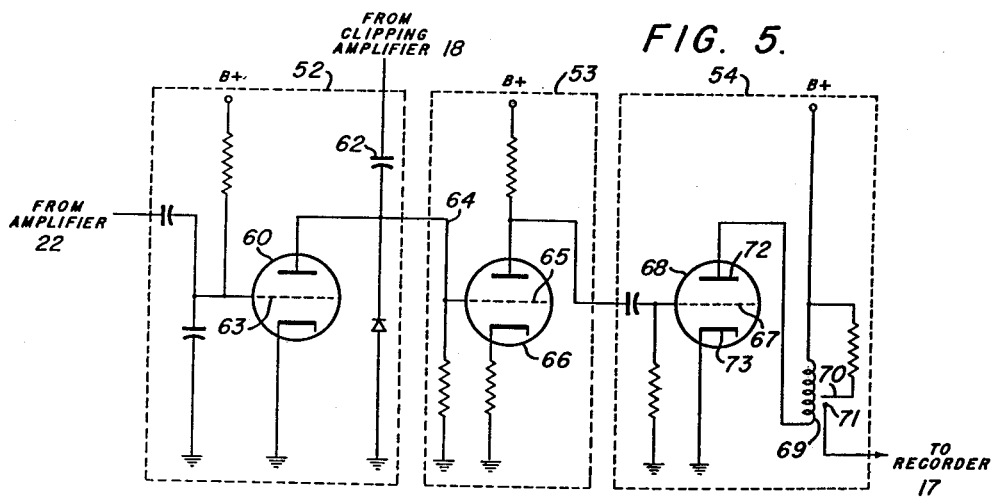
Fig. 5 is an electric circuit diagram of a portion of the system shown in Fig. 4.

Fig. 5 is an electrical circuit diagram showing a portion of the system shown in Fig. 4. As shown in Fig. 5 the signals from the amplifier and phase inverter 22 are fed to the mixer 52 which includes therein an electronic tube 60. The signal from the clipping amplifier 18 is fed by means of conductors 106 through a capacitor 62. The time constant of the mixer 52 depends upon the capacitance of capacitor 62 and the resistance of electronic tube 60. The resistance of electronic tube 60 depends upon the amplitude of the signal fed to the grid 63 of electronic tube 60. The larger the amplitude of the signal fed to grid 63, the larger the resistance of electronic tube 60 will be.

The pulse fed to conductor 64 depends upon the time constant of the mixer 52. The larger the resistance of electronic tube 60 the longer the time constant and the longer the output pulse conducted through conductor 64 will be. Therefore, sinusoidal signals of relatively large amplitude fed to mixer 52 will result in the production of relatively long pulses through conductor 64 to the grid 65 of an electronic tube 66 which serves as an amplifier and phase inverter. The pulses from amplifier and phase inverter 53 are conducted to the grid 67 of an electronic tube 68 contained within the pulse shaper 54.

Also included in the pulse shaper 54 is a relay 69 which has a switch 70 adapted to engage contact 71. The relay 69 is normally open and current is conducted from a voltage source B+ through relay 69, plate 72, and cathode 73 to ground, the grid 67 being positively biased. When a signal is conducted to grid 67, which signal is a negative signal, the flow of current through the relay 69 is interrupted and switch 70 engages contact 71 for a length of time dependent upon the length of the pulses fed to grid 67. Current is then fed from B+ through switch 70 and contact 71 to the recorder 17 and recorded.

Figure 6:
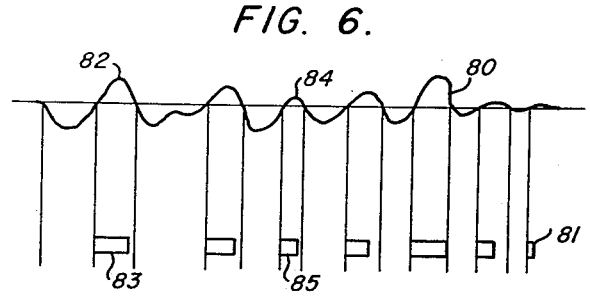
Fig. 6 is a graphical representation showing a seismic signal and the recordings obtained from said seismic signal utilizing the system shown in Fig. 4.

Fig. 6 shows in graphical form an example of an original signal 80 and the type of presentation 81 obtained utilizing my new system shown in Fig. 4. As shown in Fig. 6 the pulses begin at the same times as the positive upswing of the corresponding sinusoidal pulse and continue for a time proportional to the amplitude of the corresponding sinusoidal pulses. For example, a portion of trace 80 of large amplitude such as shown at 82 produces a pulse 83 whereas a portion of trace 80 of relatively small amplitude such as at 84 produces a smaller rectangular pulse 85.

It is to be understood that although one geophone and one electronic system is shown in each of Figs. 1 and 4 if desired a plurality of geophones can be utilized with one electronic system for each geophone. It is also to be understood that although the systems shown produce electrical signals representative of the positive upswing of the original sinusoidal wave forms if desired these pulses can be produced at any desired point on the sinusoidal wave such as the negative downswings of the original sinusoidal pulses or at the peaks of the original pulses.

Although I have described my invention with a certain degree of particularity, it is understood that the present disclosure has been made only by way of example and that numerous changes in the method and details of construction and the combination and arrangement of parts may be resorted to without departing from the spirit and the scope of the invention as hereinafter claimed.

What I wish to claim as new and useful and to secure by Letters Patent is:

1. Apparatus for obtaining geophysical information, comprising: generating means for generating primary electrical signals responsive to elastic waves received thereby; circuit means coupled to said generating means responsive to changes of said primary electrical signals from a given polarity to the opposite polarity to generate secondary electrical signals variable in duration proportional to the amplitude of said primary electrical signals; and recording means for recording said secondary electrical signals.

2. Apparatus for obtaining geophysical information, comprising: generating means for generating primary electrical signals responsive to seismic waves received thereby; first circuit means coupled to said generating means responsive to each change in polarity of said primary signals from a given polarity to the opposite polarity to produce a steep wave front output signal having an amplitude greater than a given amplitude for a period proportional to the maximum amplitude reached by said generating means output signal after each change in polarity; and shock-excited oscillator means coupled to said first circuit means responsive to the output signal of said first circuit means to produce an oscillatory output signal during the interval that the output signal of said first circuit means is at an amplitude greater than said given amplitude; and recording means coupled to said oscillator adapted to record the output signals of said oscillator.

3. Apparatus for obtaining geophysical information, comprising: generating means adapted to produce electrical signals of alternating polarity, responsive to seismic waves received thereby; first circuit means coupled to said geophone for initiating an output pulse of substantially rectangular wave shape when the output signals of said generating means change from a given polarity to the opposite polarity; a timing circuit coupled to said first circuit means for energization by the output pulses of said first circuit means, said timing circuit comprising series connected capacitor means and variable resistance means; said variable resistance means having a control circuit and being variable in resistance inversely with the amplitude of a signal coupled to said control circuit thereof; said control circuit coupling said generating means to said variable resistance means adapted to vary the resistance of said variable resistance means inversely with the maximum amplitude achieved by the output signal of said generating means after initiation of an output pulse by said first circuit means so that timing circuit output signals taken across said variable resistance means vary in duration proportional to the amplitude of the output signals of the generating means; pulse shaping means coupled to said variable resistance means for producing rectangular wave pulses having the same duration as the signals appearing across said resistance means; and means for recording the output pulses of said pulse shaping means.

References Cited in the file of this patent
UNITED STATES PATENTS

| | | |
|---|---|---|
| 1,780,567 | Rieber | Nov. 4, 1930 |
| 2,099,536 | Scherbatskoy et al. | Nov. 16, 1937 |
| 2,419,569 | Labin et al. | Apr. 29, 1947 |
| 2,623,805 | Sewell | Dec. 30, 1952 |
| 2,643,819 | Lee et al. | June 30, 1953 |
| 2,688,124 | Doty et al. | Aug. 31, 1954 |
| 2,767,388 | Rust | Oct. 16, 1956 |
| 2,791,288 | Meier | May 7, 1957 |